US006892864B2

United States Patent
Iyengar et al.

(10) Patent No.: US 6,892,864 B2
(45) Date of Patent: May 17, 2005

(54) TEMPERATURE COMPENSATION FOR MAGNETORHEOLOGICAL FLUID DAMPERS

(75) Inventors: Vardarajan R. Iyengar, Pontiac, MI (US); Bruce A. Heaston, West Milton, OH (US); John F. Hoying, Centerville, OH (US); David A. Shal, Bellbrook, OH (US); Darin D. Dellinger, Tipp City, OH (US); Khaled M. Jundi, Dayton, OH (US); Jesse D. Jones, Brighton, MI (US); Timothy J. Juuhl, Clarkston, MI (US); Robin Oakley, Trumilly (FR); David J. Barta, Bellbrook, OH (US); Michael R. Lukuc, New Carlisle, OH (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 09/981,082

(22) Filed: Oct. 16, 2001

(65) Prior Publication Data

US 2003/0070892 A1 Apr. 17, 2003

(51) Int. Cl.[7] .................................................. F16F 9/52
(52) U.S. Cl. ......................................... 188/276; 701/37
(58) Field of Search ........................... 188/267.1, 267.2, 188/276, 266.1; 267/140.14, 140.15; 701/37, 38, 36; 280/5.5, 5.515, 5.519

(56) References Cited

U.S. PATENT DOCUMENTS

| | | | | |
|---|---|---|---|---|
| 4,650,042 A | * | 3/1987 | Knecht et al. ........... 188/266.6 |
| 5,100,166 A | * | 3/1992 | Mitsui ...................... 188/267.1 |
| 5,103,397 A | * | 4/1992 | Ikemoto et al. ............... 701/38 |
| 5,200,895 A | * | 4/1993 | Emura et al. ............ 188/266.1 |
| 5,367,459 A | * | 11/1994 | Shtarkman et al. ........... 701/37 |
| 5,396,973 A | * | 3/1995 | Schwemmer et al. ..... 188/267.2 |
| 5,555,500 A | * | 9/1996 | Ogawa et al. ................. 701/36 |
| 5,579,229 A | * | 11/1996 | Maguran, Jr. ............ 280/5.504 |
| 5,788,028 A | * | 8/1998 | Bieber ...................... 188/266.6 |
| 5,944,151 A | * | 8/1999 | Jakobs et al. ............ 188/267.2 |
| 5,968,102 A | | 10/1999 | Ichimaru et al. |

FOREIGN PATENT DOCUMENTS

| EP | 0416556 | 3/1991 |
|---|---|---|
| EP | 0650859 | 5/1995 |

* cited by examiner

Primary Examiner—Thomas Williams
(74) Attorney, Agent, or Firm—Michael D. Smith

(57) ABSTRACT

A temperature compensation method for controlling a damping force of a magnetorheological (MR) damper is disclosed. First, a base operating current as a function of a desired force level of a damping force of the MR damper is determined, and a temperature compensation as a function of an operating temperature of the MR damper is determined. Finally, the temperature compensation is applied to the base operating current to generate a compensated operating current as a function of the desired force level of the damping force and the operating temperature of the MR damper. To refine the compensated operating current, the temperature compensation can be determined as both a function of the operating temperature of the MR damper and a relative velocity of the MR damper.

15 Claims, 16 Drawing Sheets

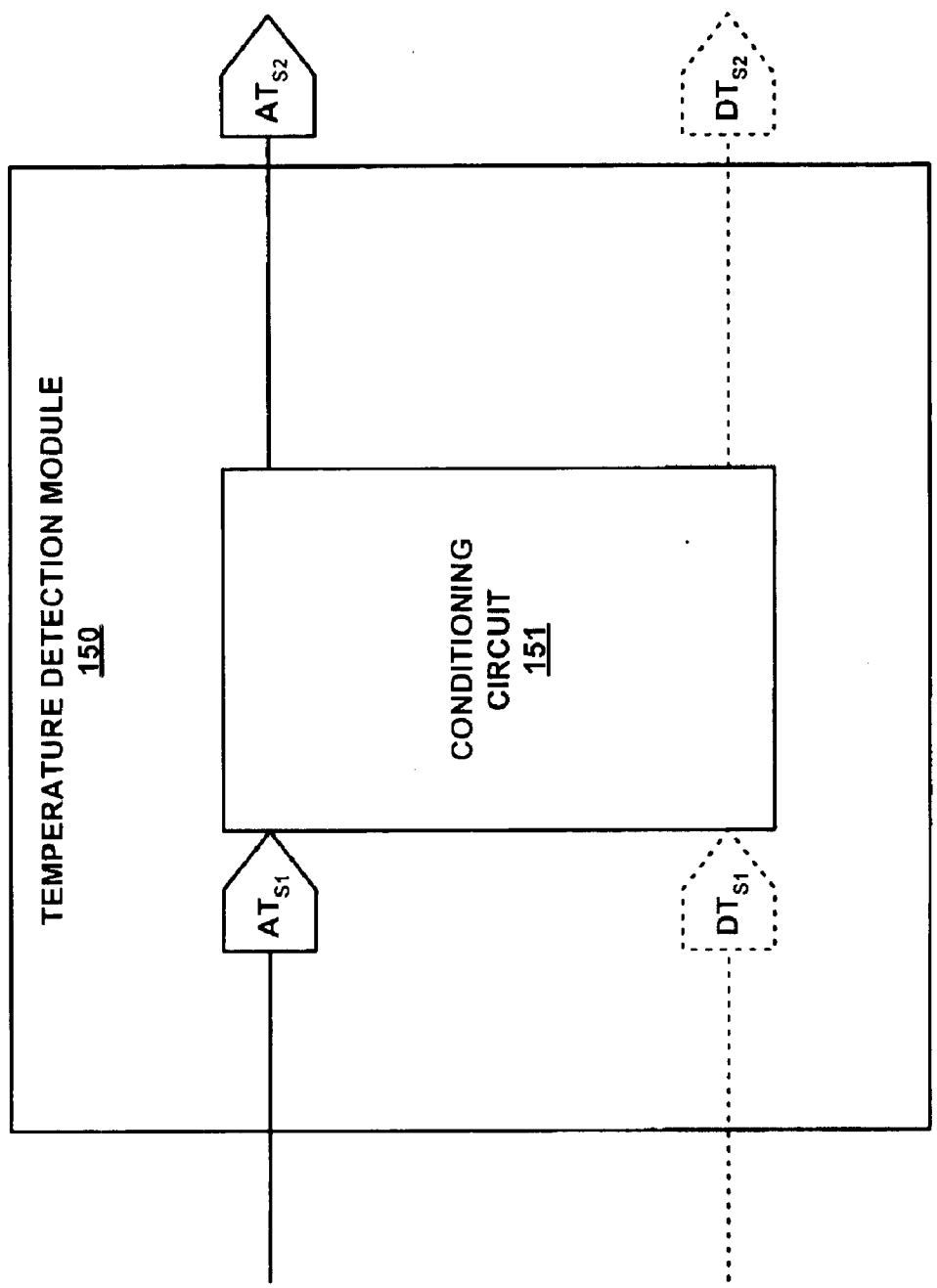

TEMPERATURE COMPENSATION FOR MAGNETORHEOLOGICAL FLUID DAMPERS

BACKGROUND OF THE INVENTION

1. Field of the Invention

The present invention generally relates to an operation of a magnetorheological fluid (MR) damper. The present invention specifically relates to an application of a temperature compensation to an operating current of a MR damper.

2. Description of the Related Art

FIG. 1 illustrates a MR damper 10 as known in the art. MR damper 10 includes a cylindrical tube 11 and a cylindrical sleeve 12 affixed to an outer surface of an upper end of cylindrical tube 11 whereby a cavity is formed. The cavity contains a magnetorheological (MR) fluid consisting of small soft-magnetic particles dispersed throughout the cavity. A cylindrical valve 13 having an annular fluid passageway 14 and a coil 15 is slidably positioned within the cavity. Any linear displacement of valve 13 within the cavity involves some degree of flow of the MR fluid through fluid passageway 14. A rod 16 extends through sleeve 12 and is adjoined to valve 13 whereby valve 13 is linearly displaced within the cavity whenever an operating force in the form of a compression force CF or an extension force EF being applied to rod 16 exceeds a damping force of the MR fluid within the cavity.

The damping force of the MR fluid is a combination of laminar forces related to a fluid viscosity of the MR fluid and the dimensions of fluid passageway 14, and shear forces due to the MR effect. Thus, to generate the damping force at a desired force level, a controller 20 supplies an operating current $I_{OS}$ having a corresponding ampere level to a coil 16 via a conductor 21 whereby a magnetic field of a corresponding strength is generated. However, the fluid viscosity of the MR fluid varies strongly with an operating temperature of MR damper 10 based upon an ambient temperature of MR damper 10 and any internal heat generated during an operation of MR damper 10. Consequently, under some operating temperatures, the actual force level of the damping force of the MR fluid can significantly vary from the desired force level of the damping force.

There is therefore a need for a temperature compensation method for overcoming the aforementioned shortcomings described herein. The present invention addresses this need.

SUMMARY OF THE INVENTION

The present invention provides a controller for implementing a method for controlling a damping force of a damper in view of an operating temperature of the damper. Various aspects of the invention are novel, non-obvious, and provide various advantages. While the actual nature of the invention covered herein can only be determined with reference to the claims appended hereto, certain features which are characteristic of the preferred embodiment disclosed herein are described briefly as follows.

One form of the present invention is a method for controlling a damping force of a damper. First, a first operating current is determined as a function of a desired force level of the damping force. Second, a temperature compensation as a function of an operating temperature of the damper is determined. Finally, the temperature compensation is applied to the first operating current to generate a second operating current as a function of both the desired force level of the damping force and the operating temperature of the damper.

A second form of the invention is a device for controlling a damping force of a damper. The device includes means for determining a first operating current as a function of a desired force level of the damping force, means for determining a temperature compensation as a function of an operating temperature of the damper, and means for applying the temperature compensation to the first operating current to generate a second operating current as a function of both the desired force level of the damping force and the operating temperature of the damper.

A third form of the invention is a system comprising a damper and a controller. The controller includes means for determining a first operating current as a function of a desired force level of a damping force of the damper, means for determining a temperature compensation as a function of an operating temperature of the damper, and means for applying the temperature compensation to the first operating current to generate a second operating current as a function of both the desired force level of the damping force and the operating temperature of the damper.

The foregoing forms, and other forms, features and advantages of the present invention will become further apparent from the following detailed description of the presently preferred embodiments, read in conjunction with the accompanying drawings. The detailed description and drawings are merely illustrative of the present invention rather than limiting, the scope of the present invention being defined by the appended claims and equivalents thereof.

BRIEF DESCRIPTION OF THE DRAWINGS

FIG. 4 is an illustration of a block diagram of a first embodiment of a temperature detection module in accordance with the present invention;

DETAILED DESCRIPTION OF THE PRESENTLY PREFERRED EMBODIMENTS

Figure 2:
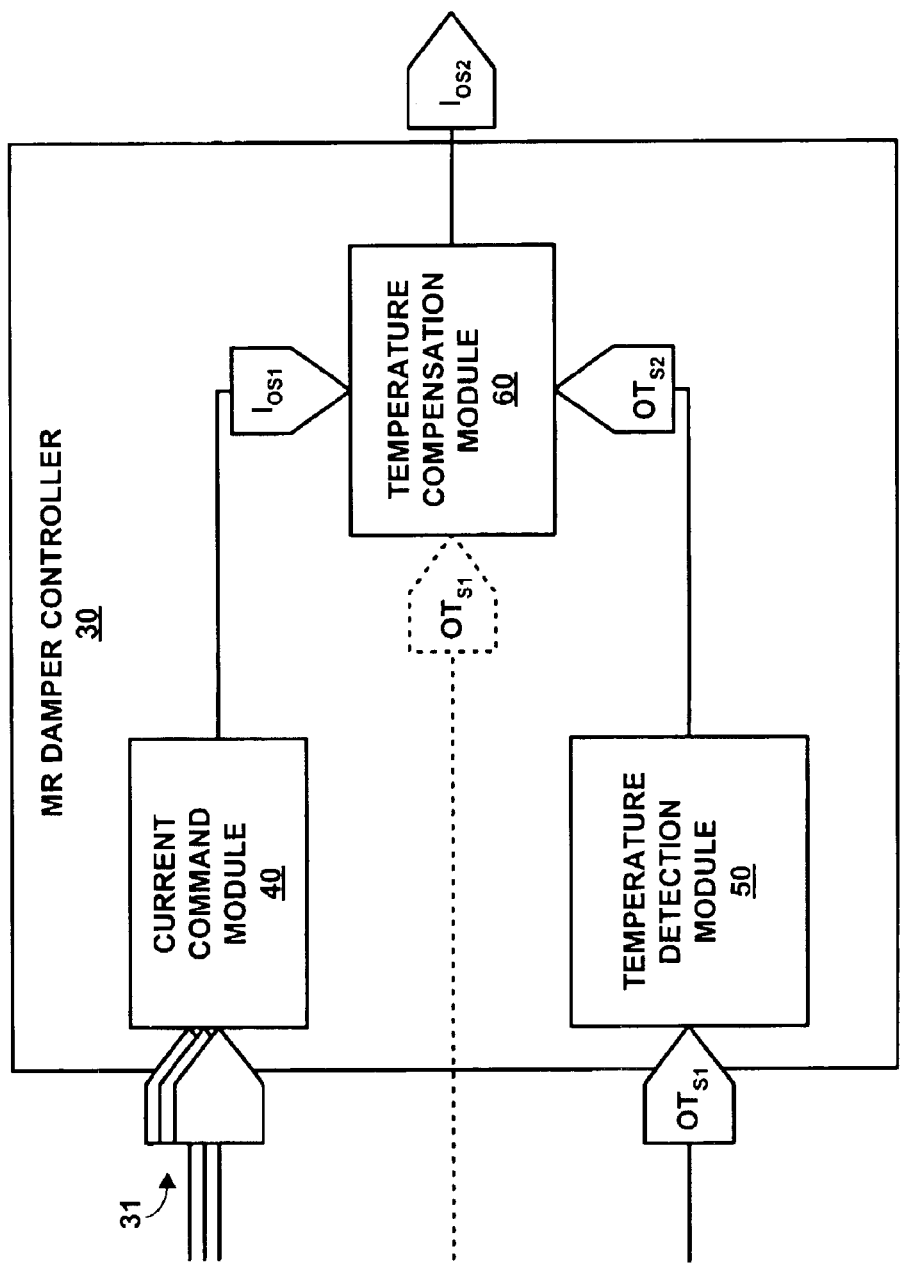
FIG. 2 is an illustration of a block diagram of a MR damper controller in accordance with the present invention.

FIG. 2 illustrates a MR damper controller 30 of the present invention. MR damper controller 30 comprises a conventional current command module 40, a temperature detection module 50, and a temperature compensation module 60. The modules 40, 50, and 60 can include software, hardware in the form of analog and/or digital circuitry, or a combination of software and hardware. In one embodiment, controller 30 includes an integrated processing unit (not shown) operatively coupled to one or more solid-state memory devices (not shown) storing programming corresponding to modules 40, 50 and 60 that is to be executed by the processing unit. The memory devices may be either volatile or nonvolatile and may additionally or alternatively be of the magnetic or optical variety. Besides the memory and processing unit, controller 30 additionally includes any control clocks, interfaces, communication ports, or other types of operators as would occur to those skilled in the art to implement the principals of the present invention.

Figure 1:
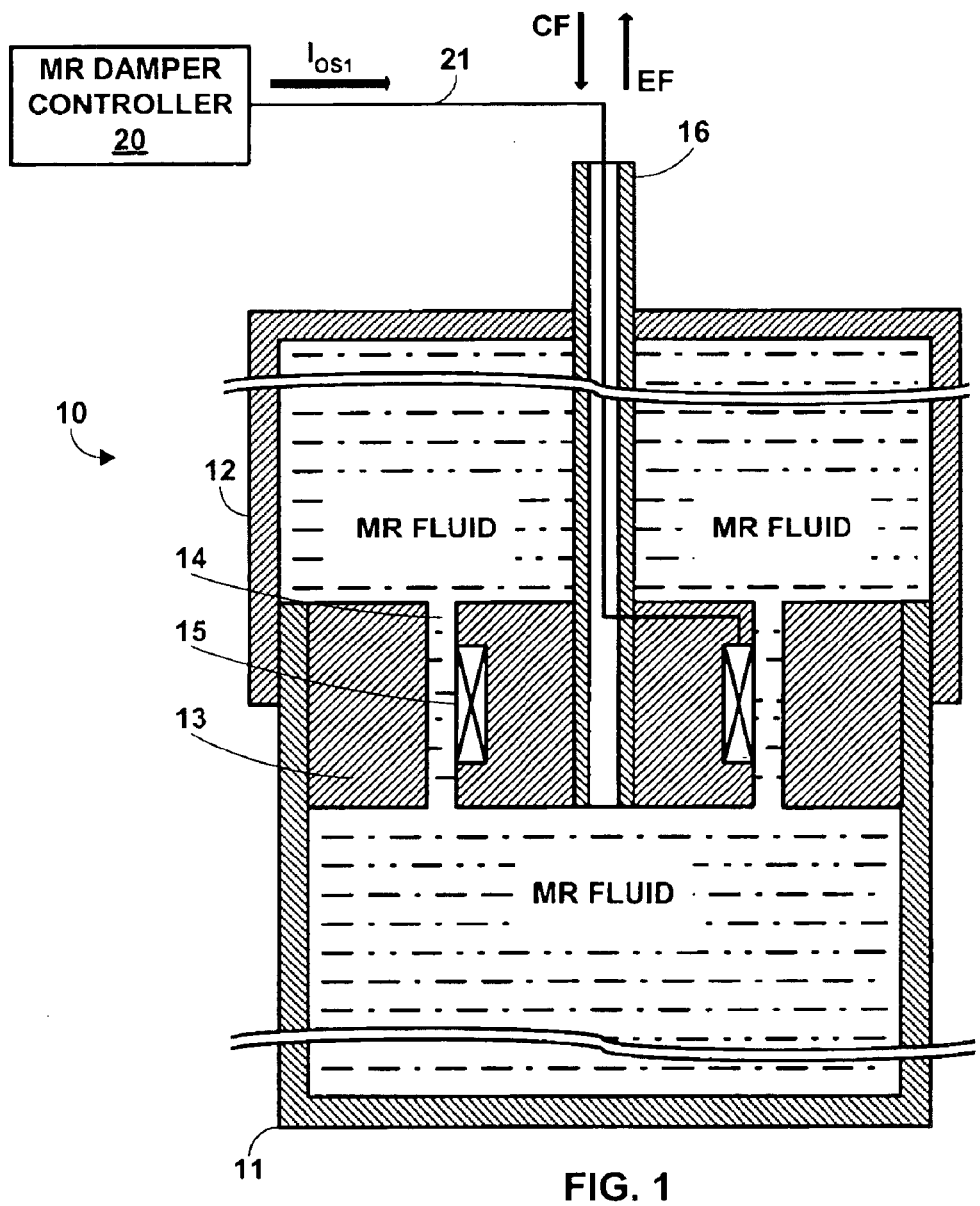
FIG. 1 is an illustration of a MR damper as known in the art.

Controller 30 may be employed with any configuration of a MR damper. To facilitate an understanding of the present invention, the following description of modules 40, 50, and 60 herein will be in the context of an employment of controller 30 for controlling MR damper 10 (FIG. 1).

Current command module 40 conventionally provides an operating current $I_{OS1}$ as a function of a desired force level of the damping force of MR damper 10. To generate operating current $I_{OS1}$, current command module 40 receives one or more signals 31 as input variables to an algorithm that determines the desired force level of the damping force of MR damper 10. In one embodiment, MR damper 10 is coupled between a vehicle body and a wheel, and the operating condition signals 31 are indicative of various operating conditions of the vehicle (e.g., vehicle speed, driver steering and throttle inputs, vehicle body and/or wheel motions and other signals as would occur to those having ordinary skill in the art. In response thereto, current command module 40 executes one or more conventional algorithms for determining the desired force level of the damping force of MR damper 10 that facilitates an optimal ride and handling of the vehicle under a baseline operating temperature. Such algorithms can include a conventional algorithm for controlling the motion of the vehicle body, a conventional algorithm for controlling the motion of the wheel, a conventional algorithm for controlling a stability and a handling of the vehicle, one or more conventional algorithms for managing damper travel limitations, and other conventional algorithms as would occur to those having ordinary skill in the art.

Figure 3A:
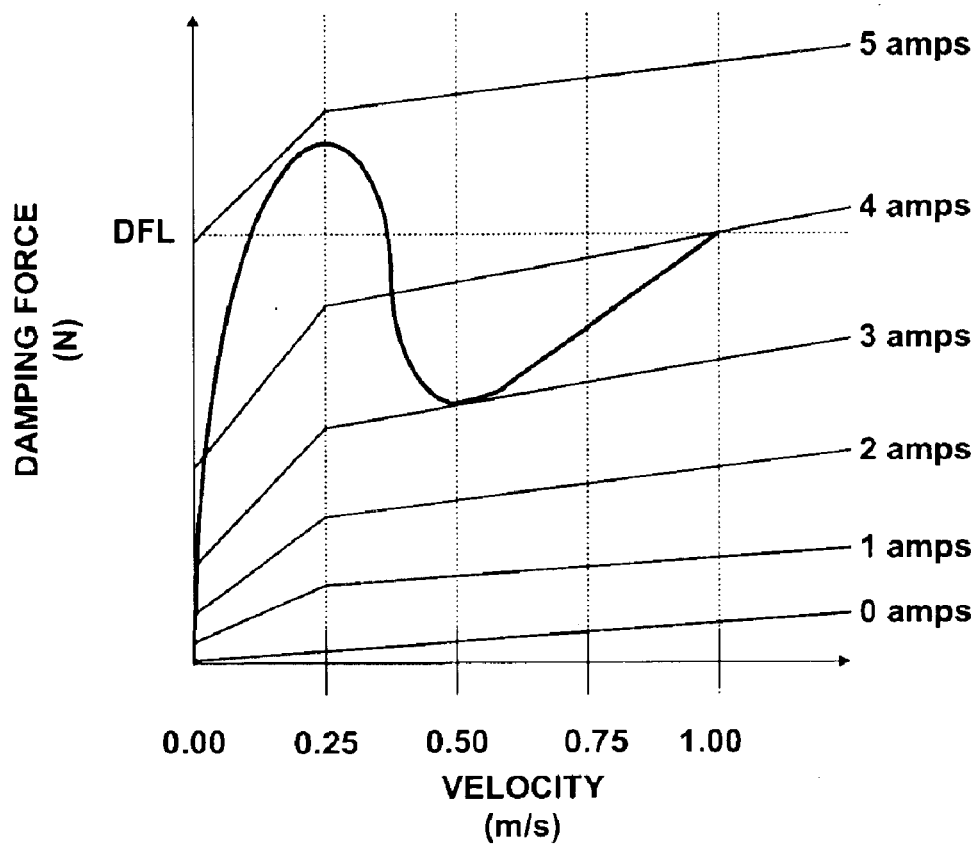
FIG. 3A is an illustration of a first exemplary force-velocity curve of the MR damper of FIG. 1.
Figure 3B:
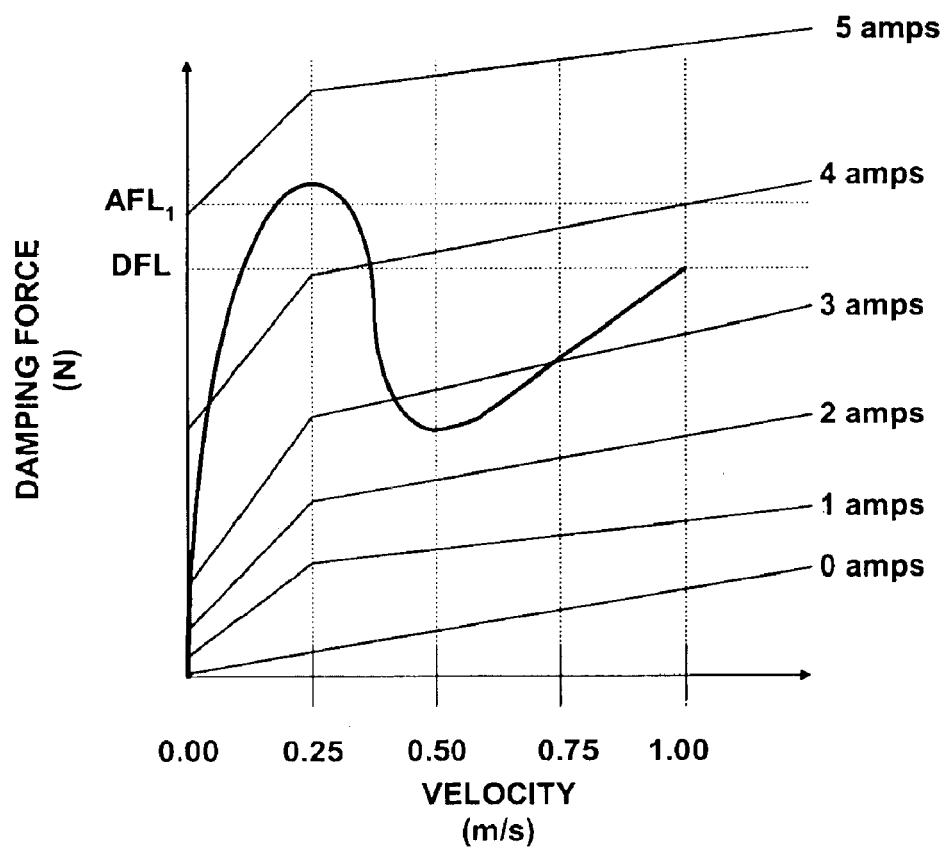
FIG. 3B is an illustration of a second exemplary force-velocity curve of the MR damper of FIG. 1.
Figure 3C:
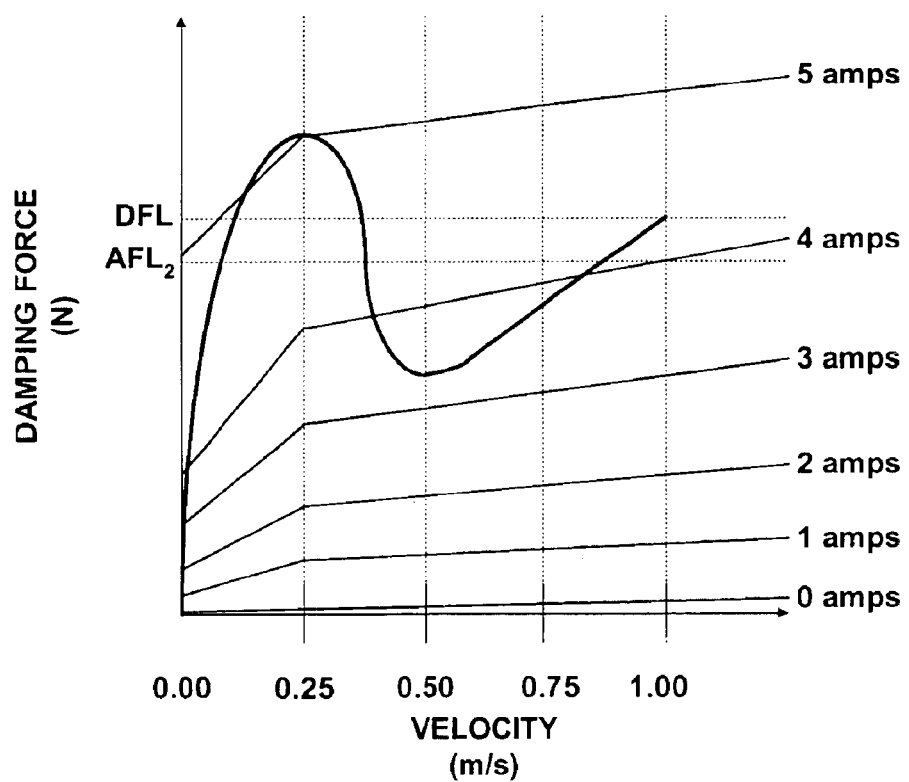
FIG. 3C is an illustration of a third exemplary force-velocity curve of the MR damper of FIG. 1.

The result of the execution of the algorithm(s) by current command module 40 is a generation of operating current $I_{OS1}$ at an ampere level to achieve the desired force level of the damping force as a function of a damping velocity of MR damper 10. For example, FIG. 3A illustrates an exemplary force-velocity calibration curve of MR damper 10 for an operating temperature of +20° C. as the baseline temperature. As shown in FIG. 3A, the ampere level of operating current $I_{OS1}$ must be 4 amps in order to achieve a desired force level DFL when the damping velocity of MR damper 10 is 1.00 m/s. The generation of operating current $I_{OS1}$ by current command module 40 however does not account for the operating temperature of MR damper 10 being less than or greater than the baseline temperature. Consequently, the desired force level DFL of the damping force may not be achieved. For example, FIG. 3B illustrates an exemplary force-velocity calibration curve of MR damper 10 for an operating temperature of −20° C. As shown in FIG. 3B, an actual force level $AFL_1$ being greater than the desired force level DFL is achieved when the ampere level of operating current $I_{OS1}$ is 4 amps and the damping velocity of MR damper 10 is 1.00 m/s under an operating temperature of −20° C. Also by example, FIG. 3C illustrates an exemplary force-velocity calibration curve of MR damper 10 for an operating temperature of +60° C. As shown in FIG. 3C, an actual force level $AFL_2$ being less than the desired force level DFL is achieved when the ampere level of operating current $I_{OS1}$ is 4 amps and the damping velocity of MR damper 10 is 1.00 m/s under an operating temperature of +60° C.

Temperature detection module 50 and temperature compensation module 60 are collectively directed to an achievement of the desired force level DFL within a wide range of operating temperatures of MR damper 10. Specifically, temperature detection module 50 and temperature compensation module 60 operate to determine and apply a temperature compensation to operating current $I_{OS1}$ to generate an operating current $I_{OS2}$ as a function of both the desired force level of the damping force of MR damper 10 and the operating temperature of MR damper 10. For example, referring to FIG. 3B, operating current $I_{OS2}$ would be generated with an ampere level approximating 3.5 amps when the damping velocity of MR damper 10 is 1.00 m/s under an operating temperature of −20° C. to thereby substantially achieve the desired force level DFL. Also by example, referring to FIG. 3C, operating current $I_{OS2}$ would be generated with an ampere level approximating 4.2 amps when the damping velocity of MR damper 10 is 1.00 m/s under an operating temperature of +60° C. to thereby substantially achieve the desired force level DFL.

Individual descriptions of various embodiments of temperature detection module 50 and temperature compensation module 60 will now be described herein.

Temperature detection module 50 provides an operating temperature signal $OT_{S2}$ in response to a reception of either an operating temperature signal $OT_{S1}$ that is indicative of a directly or indirectly measured operating temperature of MR damper 10. FIG. 4 illustrates a temperature detection module 150 as one embodiment of temperature detection module 50. Temperature detection model 150 includes a conditioning circuit 151 for receiving operating temperature signal $OT_{S1}$ (FIG. 2) in the form of an ambient temperature signal $AT_{S1}$ that is indicative of an ambient temperature of MR damper 10 (i.e., temperature of the air surrounding MR damper 10 or a system incorporating MR damper 10, such as, for example, a vehicle). When MR damper 10 is employed within a vehicle, ambient temperature signal $AT_{S1}$ can be provided by an outside air temperature sensor, an engine air intake sensor, and other sensors as would occur to those having ordinary skill in the art. In response to a reception of ambient temperature signal $AT_{S1}$, conditioning circuit 151 conditions ambient temperature signal $AT_{S1}$ to provide an ambient temperature signal $AT_{S2}$ serving as operating temperature signal $OT_{S2}$ (FIG. 2). Such conditioning can include analog-to-digital conversion, signal scaling or conversion operations, analog or digital filtering operations, and other conditioning techniques as would occur to those having ordinary skill in the art. Alternatively, conditioning circuit 151 can receive operating temperature signal $OT_{S1}$ in the form of a damper temperature signal $DT_{S1}$ that is indicative of the internal temperature of MR damper 10 as directly measured within the cavity of MR damper 10 via a thermocouple or the like. In response to a reception of damper temperature signal $DT_{S1}$, conditioning circuit 151 conditions damper temperature signal $DT_{S1}$ to provide a damper temperature signal $DT_{S2}$ serving as operating temperature signal $OT_{S2}$.

Figure 5A:
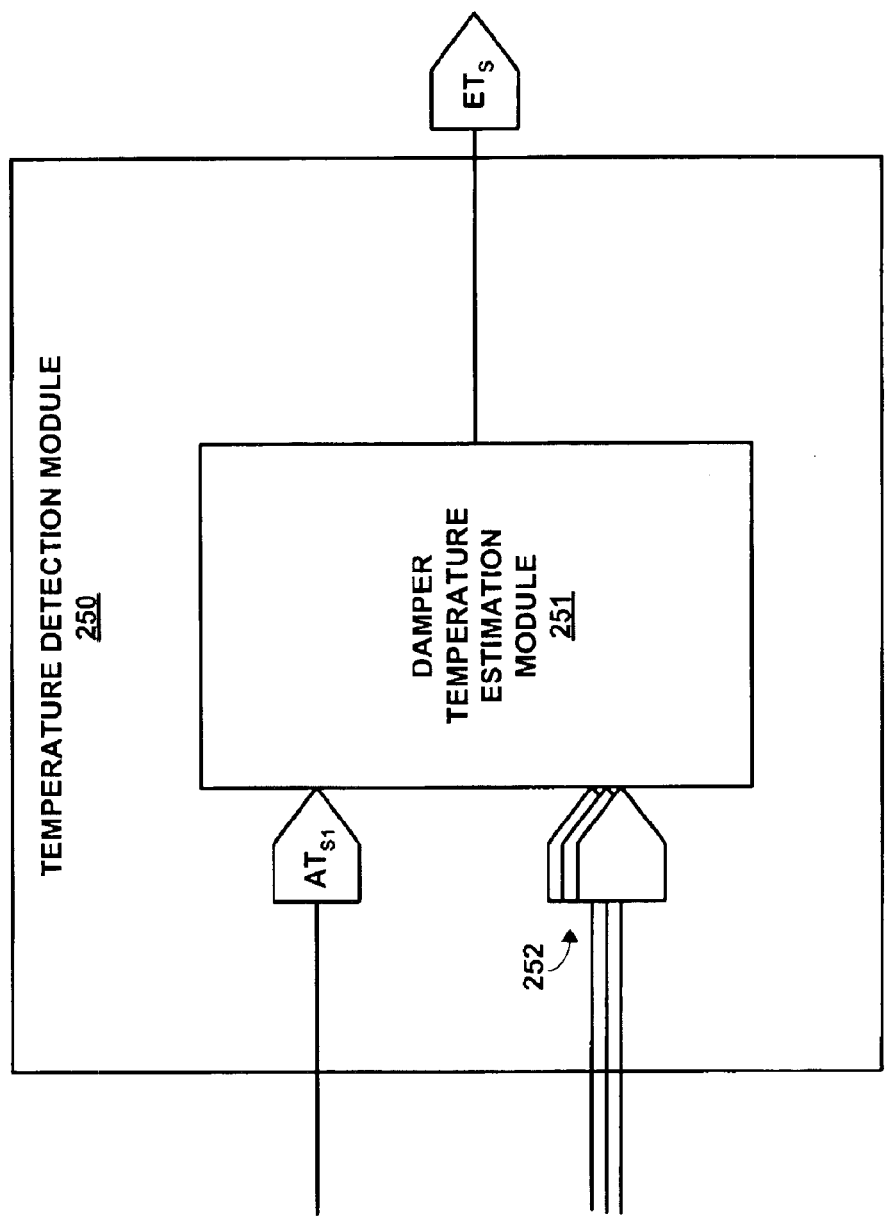
FIG. 5A is an illustration of a block diagram of a second embodiment of a temperature detection module in accordance with the present invention.
Figure 5B:
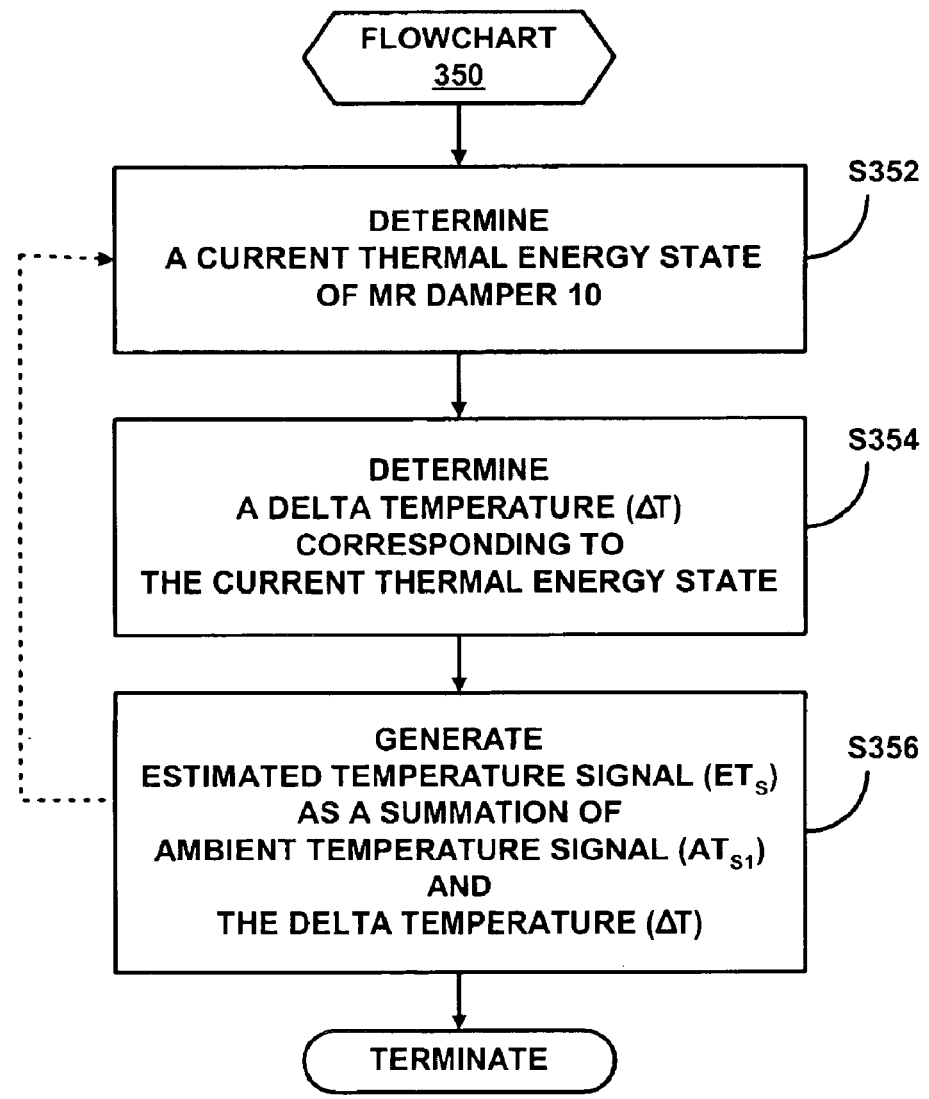
FIG. 5B is an illustration of a flowchart of one embodiment of a estimated damper temperature method in accordance with the present invention.

FIG. 5A illustrates a temperature detection module 250 as a second embodiment of temperature detection module 50. Temperature detection model 250 includes a damper temperature estimation module 251 for receiving operating temperature signal $OT_{S1}$ (FIG. 2) in the form of ambient temperature signal $AT_{S1}$ and a plurality of signals 252 indicative of various operating conditions of MR damper 10 (e.g., a damper force/current and a damper velocity). In response to a reception of ambient temperature signal $AT_{S1}$ and signals 252, damper temperature estimation module 251 provides an estimated damper temperature signal $ET_S$ as a computation of an execution of a thermal energy model method of the present invention. FIG. 5B illustrates a flowchart 350 as a representation of the thermal model method. Damper temperature estimation module 251 determines a current thermal energy state of MR damper 10 during stage S352 of flowchart 350. In one embodiment, damper temperature estimation module 251 determines an initial energy consumption by MR damper 10 during an initial operation of MR damper 10 to thereby establish an initial thermal energy state of MR damper 10. Thereafter, damper temperature estimation module 251 downwardly adjusts the initial thermal energy state of MR damper 10 in view of various cooling effects upon MR damper 10 between operations of MR damper 10 and upwardly adjusts the thermal energy state in view of additional energy consumption by MR damper 10 during subsequent operations of the MR damper 10. Those having ordinary skill in the art will appreciate various ways for determining energy consumption of MR damper 10 during operations of MR damper 10 and various cooling effects upon MR damper 10 between operations of MR damper 10 as well as the required signals 252.

The current thermal energy state is therefore the current summation of the total energy consumption by MR damper 10 and the total cooling effects upon MR damper 10 as of the instance damper temperature estimation module 251 implements stage S352. During a stage S354 of flowchart 350, damper temperature estimation module 251 determines a delta temperature T corresponding to the current thermal energy state of MR damper 10. In one embodiment, experimental data correlating delta temperatures to thermal energy states of MR damper 10 can be generated and stored whereby the experimental data can serve as a basis for a computation or retrieval of delta temperature T corresponding to the current thermal energy state of MR damper 10.

During a stage S356 of flowchart 350, damper estimation temperature module 251 generates estimated temperature signal $ET_S$ as a summation of ambient temperature signal $AT_{S1}$ and delta temperature T. The execution of flowchart 350 by damper temperature estimation module 251 can be discontinuous as shown, or continuous as indicated by the dashed arrow.

Referring again to FIG. 2, an alternative embodiment of temperature damper controller 30 can omit temperature detection module 50 whereby operating temperature signal $OT_{S1}$ in the form of ambient temperature signal $AT_{S1}$ (FIG. 4) or damper temperature signal $DT_{S1}$ (FIG. 4) is directly provided to temperature compensation module 60.

Temperature compensation module 60 provides operating current $I_{OS2}$ in response to a reception of operating current $I_{OS1}$ and operating temperature signal $OT_{S2}$ (or alternatively operating temperature signal $OT_{S1}$). Operating current $I_{OS2}$ is a function of the desired force level of the damping force of MR damper 10 as indicated by operating current $I_{OS1}$ and the operating temperature of MR damper 10 as indicated by operating temperature signal $OT_{S2}$ (or alternatively operating temperature signal $OT_{S1}$).

Figure 6A:
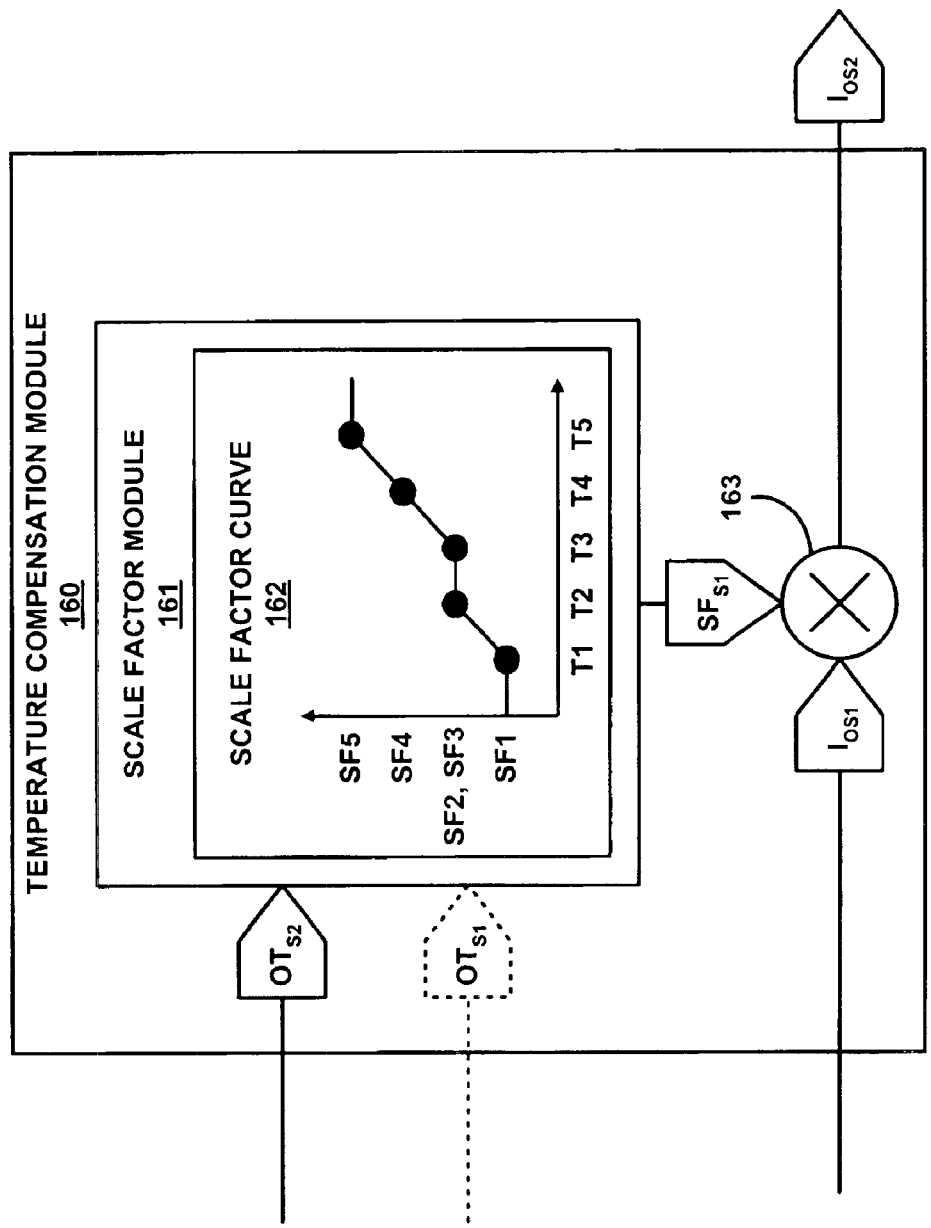
FIG. 6A is an illustration of a block diagram of a first embodiment of a temperature compensation module in accordance with the present invention.
Figure 6B:
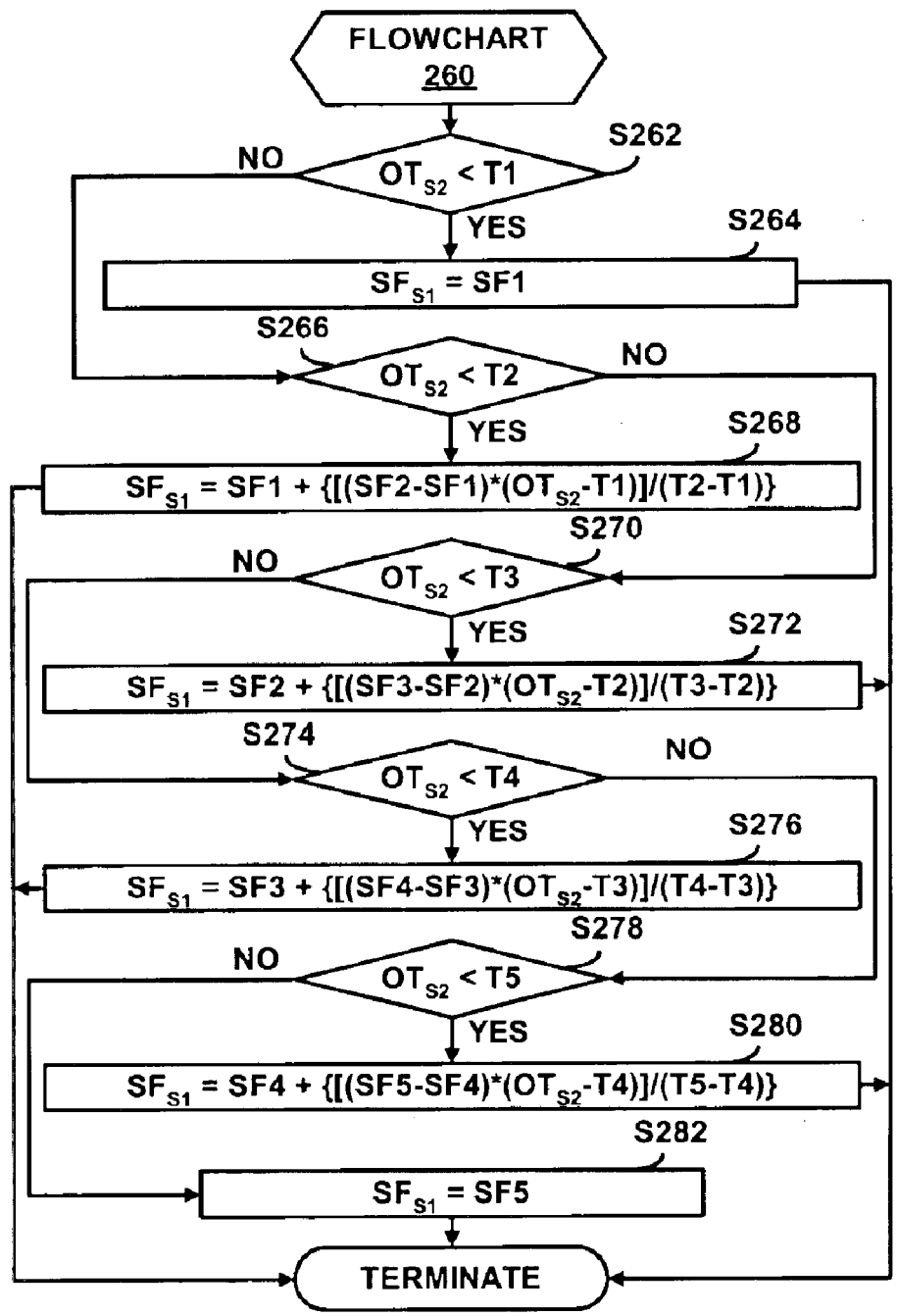
FIG. 6B is an illustration of a flowchart of a first embodiment of a scale factor determination method in accordance with the present invention.

FIG. 6A illustrates a temperature compensation module 160 as one embodiment of temperature compensation module 60. Temperature compensation module 160 includes scale factor module 161 having data representative of a scale factor curve 162 for providing a scale factor signal $SF_{S1}$ in response to a reception of operating temperature signal $OT_{S2}$ (or alternatively operating temperature signal $OT_{S1}$). In generating scale factor signal $SF_{S1}$, scale factor module 161 implements a scale factor determination method in accordance with the present invention that is based upon operating temperature signal $OT_{S2}$ (or alternatively operating temperature signal $OT_{S1}$). FIG. 6B illustrates a flowchart 260 that is representative of the scale factor determination method.

During a stage S262 of flowchart 260, scale factor module 161 determines if operating temperature signal $OT_{S2}$ (or alternatively operating temperature signal $OT_{S1}$) is less than a temperature T1 (e.g., −20 C) as listed in scale factor curve 162. If so, during a stage S264 of flowchart 260, scale factor module 161 generates scale factor signal $SF_{S1}$ equating scale factor SF1 as listed in scale factor curve 162.

Otherwise, during a stage S266 of flowchart 260, scale factor module 161 determines if operating temperature signal $OT_{S2}$ (or alternatively operating temperature signal $OT_{S1}$) is less than a temperature T2 (e.g., 0 C) as listed in scale factor curve 162. If so, during a stage S268 of flowchart 260, scale factor module 161 generates scale factor signal $SF_{S1}$ equating a computation of an interpolation equation illustrated in stage S268, which is a function of scale factor SF1, a scale factor SF2, temperature T1, and temperature T2 as listed in scale factor curve 162.

Otherwise, during a stage S270 of flowchart 260, scale factor module 161 determines if operating temperature signal $OT_{S2}$ (or alternatively operating temperature signal $OT_{S1}$) is less than a temperature T3 (e.g., +20 C) as listed in scale factor curve 162. If so, during stage S272 of flowchart 260, scale factor module 161 generates scale factor signal $SF_{S1}$ equating a computation of an interpolation equation illustrated in stage S272, which is a function of scale factor SF2, a scale factor SF3, temperature T2, and temperature T3 as listed in scale factor curve 162.

Otherwise, during a stage S274 of flowchart 260, scale factor module 161 determines if operating temperature signal $OT_{S2}$ (or alternatively operating temperature signal $OT_{S1}$) is less than a temperature T4 (e.g., +35 C) as listed in scale factor curve 162. If so, during stage S276 of flowchart 260, scale factor module 161 generates scale factor signal $SF_{S1}$ equating a computation of an interpolation equation illustrated in stage S276, which is a function of scale factor SF3, a scale factor SF4, temperature T3, and temperature T4 as listed in scale factor curve 162.

Otherwise, during a stage S278 of flowchart 260, scale factor module 161 determines if operating temperature signal $OT_{S2}$ (or alternatively operating temperature signal $OT_{S1}$) is less than a temperature T5 (e.g., +60 C) as listed in scale factor curve 162. If so, during stage S280 of flowchart 260, scale factor module 161 generates scale factor signal $SF_{S1}$ equating a computation of an interpolation equation illustrated in stage S280, which is a function of scale factor SF4, a scale factor SF5, temperature T4, and temperature T5 as listed in scale factor curve 162. Otherwise, during a stage S282 of flowchart 260, scale factor module 161 generates scale factor signal $SF_{S1}$ equating scale factor SF5 as listed in scale factor curve 162.

Referring again to FIG. 6A, temperature compensation module 160 further includes a multiplier 163 for providing operating current signal $I_{OS2}$ as a product of operating current signal $I_{OS1}$ and scale factor signal $SF_{S1}$. MR damper 10 has a defined operating current range (e.g., 0 to 5 amperes) relating to the associated design of coil 15 (FIG. 1) and a desired range of the damping force. Accordingly, operating current signal $I_{OS2}$, having been computed as the product of operating current $I_{OS1}$ and scale factor signal $SF_{S1}$ is then compared against the pre-defined upper and lower operating currents of the MR damper 10. If $I_{OS2}$ is less than a lower operating limit (e.g., 0 amps), $I_{OS2}$ is set equal to the lower operating limit. Otherwise, if $I_{OS2}$ is greater than an upper operating limit (e.g., 5 amps), $I_{OS2}$ is set equal to the upper operating limit. The need for these steps would be appreciated by those having ordinary skill in the art.

Figure 7:
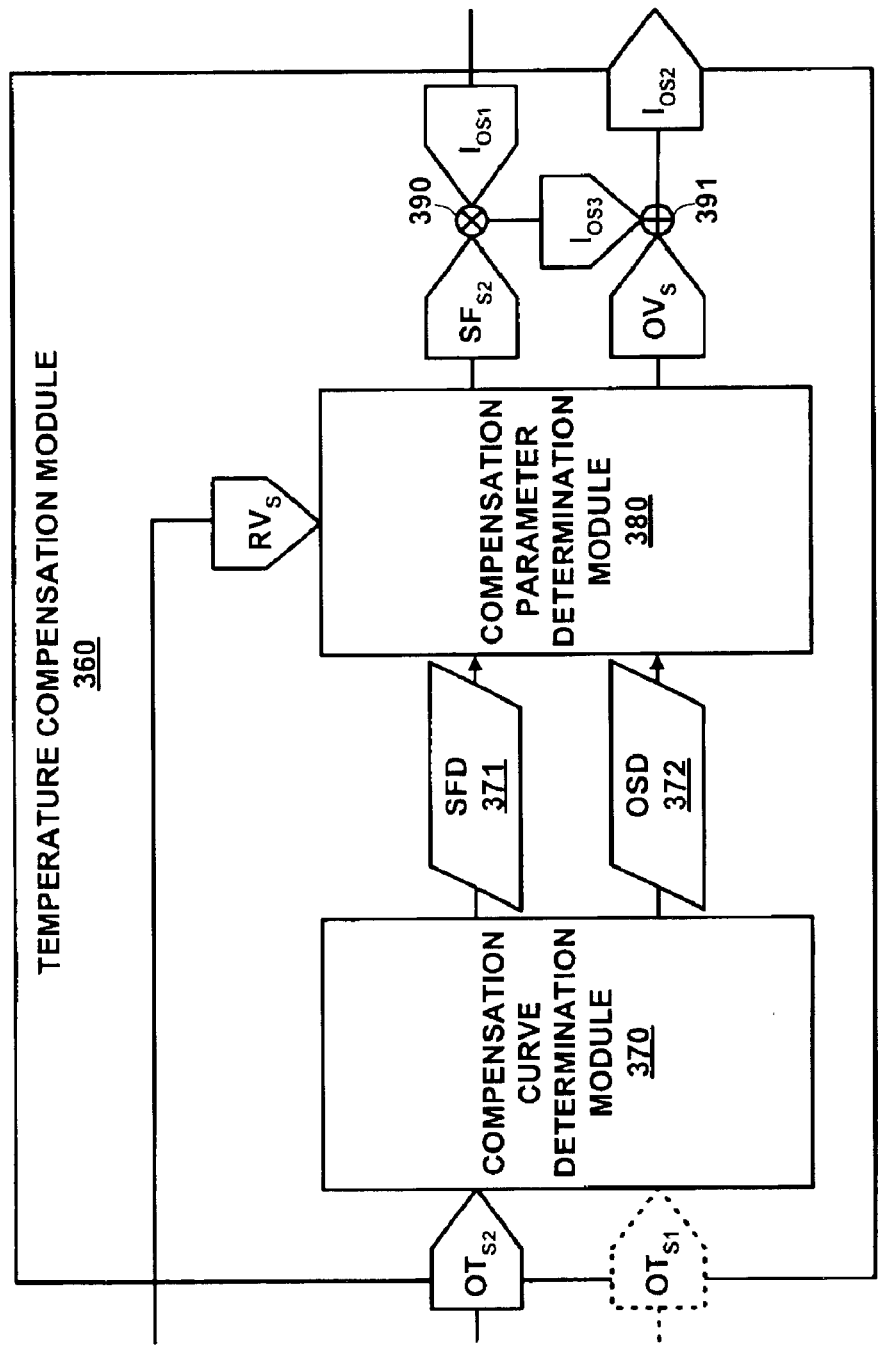
FIG. 7 is an illustration of a block diagram of a second embodiment of a temperature compensation module in accordance with the present invention.

FIG. 7 illustrates a temperature compensation module 360 as one embodiment of temperature compensation module 60. Temperature compensation module 360 includes a compensation curve determination module 370 for providing scale factor data 371 ("SFD 371") having computed scale factors SF1–SF5 and offset data 372 ("OSD 372") having computed offset values OV1–OV5 in response to a reception of operating temperature signal $OT_{S2}$ (or alternatively operating temperature signal $OT_{S1}$). One embodiment of a compensation data method for computing the scale factors SF1–SF5 included within SFD 371 and computing the offset values OV1–OV5 includes within OSD 372 will be subsequently described herein in connection with FIG. 8B.

Referring still to FIG. 7, temperature compensation module 360 further includes a compensation parameter determination module 380 for providing a scale factor signal $SF_{S2}$ and an offset value signal $OV_S$ in response to a reception of SFD 371, OSD 372, and a relative velocity signal $RV_S$ that is indicative of a velocity of MR damper 10 relative to one or more fixed point(s). When MR damper 10 is employed in a vehicle, the fixed points are represented by a coupling of MR damper 10 to a vehicle body and a coupling of MR damper 10 to a wheel whereby relative velocity signal $RV_S$ is indicative of a velocity of MR damper 10 in response to the relative motions of the vehicle and the wheel. Temperature compensation module 360 further includes a multiplier 390 for providing an operating current $I_{OS3}$ as a product of scale factor signal $SF_{S2}$ and operating current $I_{OS1}$ (FIG. 2) and an adder 391 for providing operating current $I_{OS2}$ (FIG. 2) as a summation of offset value signal $OV_S$ and operating current $I_{OS3}$. In an alternative embodiment of temperature compensation module 360, adder 391 provides operating current $I_{OS3}$ as a summation of operating current $I_{OS1}$ and offset value signal $OV_S$, and multiplier 390 provides operating current $I_{OS2}$ as a product of scale factor signal $SF_{S2}$ and operating current $I_{OS3}$.

Again, MR damper 10 has a defined operating current range (e.g., 0 to 5 amperes) relating to the associated design of coil 15 (FIG. 1) and a desired range of the damping force. Accordingly, operating current signal $I_{OS2}$, having been computed as the sum of operating current $I_{OS3}$ and scale factor signal $OV_S$ is then compared against the pre-defined upper and lower operating currents of MR damper 10. If $I_{OS2}$ is less than a lower operating limit (e.g., 0 amps), $I_{OS2}$ is set equal to the lower operating limit. Otherwise, if $I_{OS2}$ is greater than an upper operating limit (e.g., 5 amps), $I_{OS2}$ is set equal to the upper operating limit. The need for these steps would be obvious to those having ordinary skill in the art.

Figure 8A:
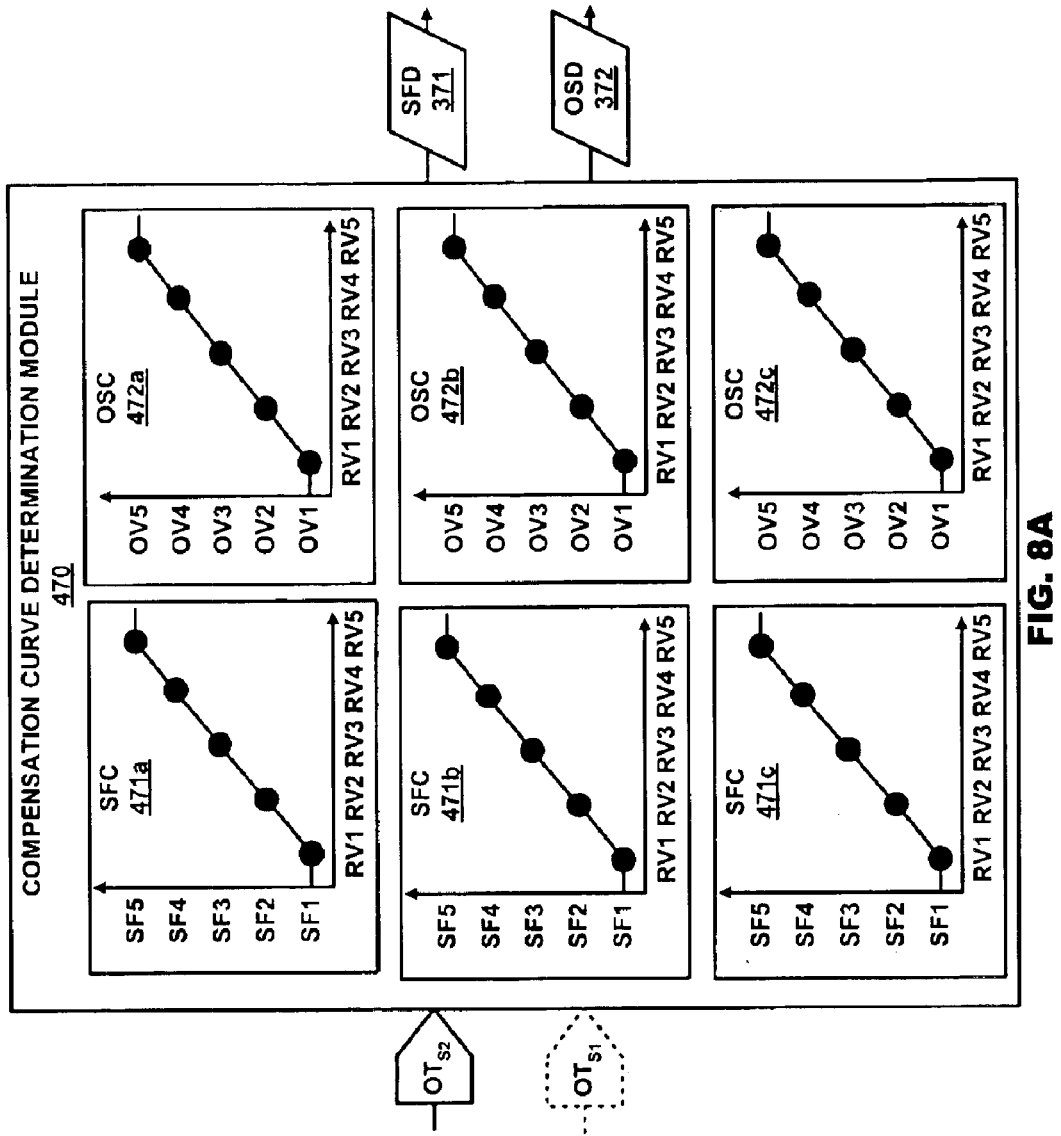
FIG. 8A is an illustration of a block diagram of one embodiment of a compensation curve determination module in accordance with the present invention.
Figure 8B:
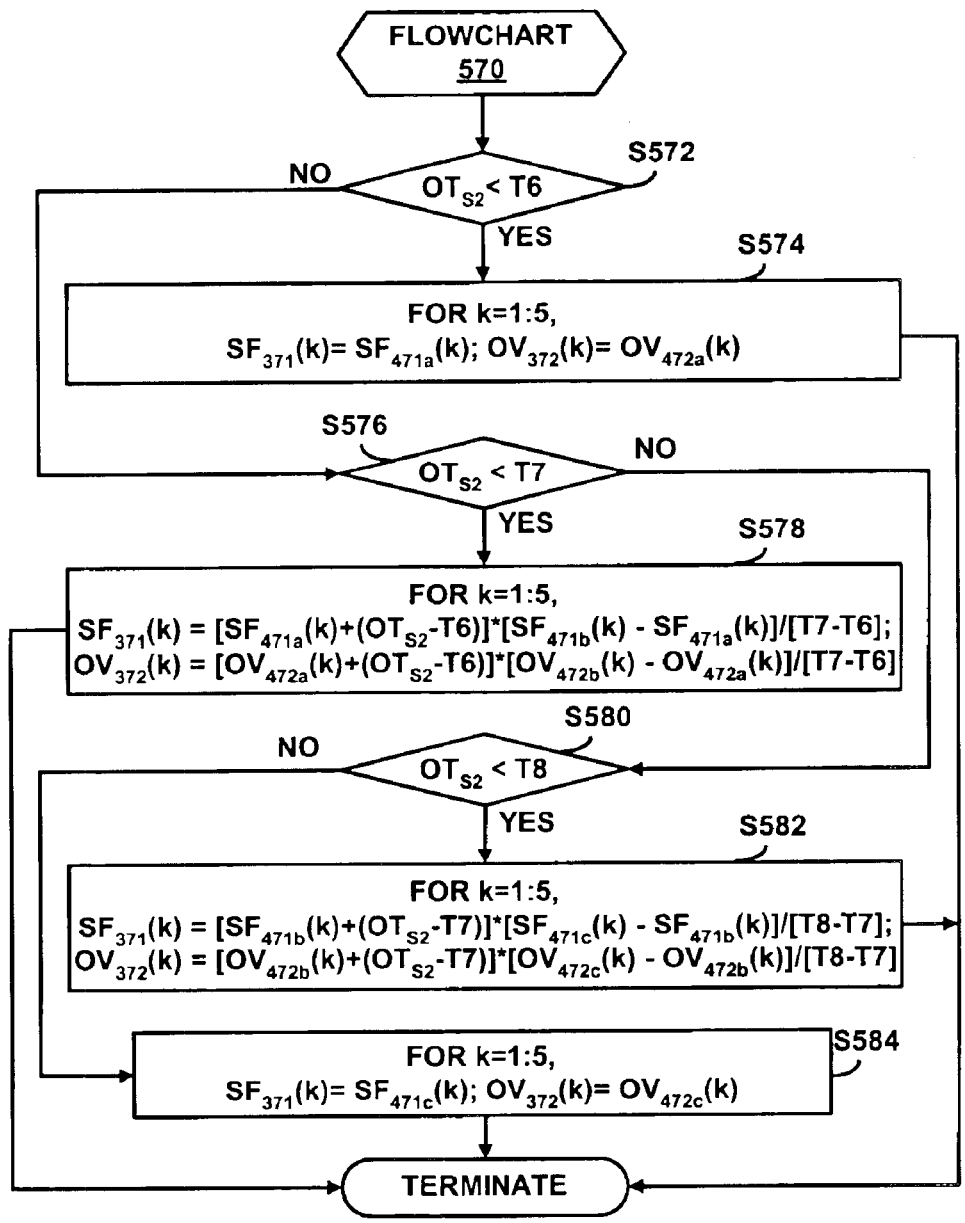
FIG. 8B is an illustration of a flowchart of one embodiment of a compensation data determination method in accordance with the present invention.

FIG. 8A illustrates a compensation curve determination module 470 as one embodiment of compensation curve determination module 370 (FIG. 7). Compensation curve determination module 470 provides SFD 371 (FIG. 7) and OSD 372 (FIG. 7) in response to a reception of operating temperature signal $OT_{S2}$ (or alternatively operating temperature signal $OT_{S1}$). In generating SFD 371 and OSD 372, compensation curve determination module 470 includes data representative of a scale factor curve 471a ("SFC 471a"), a scale factor curve 471b ("SFC 471b"), a scale factor curve 471c ("SFC 471c"), an offset curve 471a ("OSC 472a"), an offset curve 471b ("OSC 472b"), and an offset curve 471c ("OSC 472c"). The scale factors SF1–SF5 of scale factor curves 471a–471c are dissimilar due to a correlation of scale factor curves 471a–471c to three (3) different operating temperatures of MR damper 10 (e.g., –20 C, +20 C, and +60 C), respectively. The offset values OV1–OV5 of offset curves 472a–472c are dissimilar due to a correlation of offset curves 472a–472c to three (3) different operating temperatures of MR damper 10 (e.g., –20 C, +20 C, and +60 C), respectively. The relative velocities RV1–RV5 of both scale factor curves 471a–471c and offset curves 472a–472c are identical. Compensation curve determination module 470 utilizes one or more of the scale factor curves 471a–471c and offset curves 472a–472c in implementing a compensation data determination method in accordance with the present invention. FIG. 8B illustrates a flowchart 570 that is representative of the compensation data determination method.

During a stage S572 of flowchart 570, compensation curve determination module 470 determines if operating temperature signal $OT_{S2}$ (or alternatively operating temperature signal $OT_{S1}$) is less than a temperature T6 (e.g., –20 C). If so, during a stage S574 of flowchart 570, compensation curve determination module 470 generates the scale factors SF1–SF5 of SFD 371 as equating the scale factors SF1–SF5 of SFC 471a, respectively. Compensation curve determination module 470 also generates the offset values OV1–OV5 of OSD 372 as equating the offset values OV1–OV5 of OSC 472a.

Otherwise, during a stage S576 of flowchart 570, compensation curve determination module 470 determines if operating temperature signal $OT_{S2}$ (or alternatively operating temperature signal $OT_{S1}$) is less than a temperature T7 (e.g., +20 C). If so, during a stage S578 of flowchart 570, compensation curve determination module 470 generates the scale factors SF1–SF5 of SFD 371 as equating a computation of an interpolation equation illustrated in stage S578 which is a function of both the scale factors SF1–SF5 of SFC 471a and the scale factors of SFC 471b. Compensation curve determination module 470 also generates the offset values OV1–OV5 of OSD 372 as equating a computation of an interpolation equation illustrated in stage S578 which is a function of both the offset values OV1–OV5 of OSC 472a and the scale factors of OSC 472b.

Otherwise, during a stage S580 of flowchart 570, compensation curve determination module 470 determines if operating temperature signal $OT_{S2}$ (or alternatively operating temperature signal $OT_{S1}$) is less than a temperature T8 (e.g., +60 C) as listed in SFCs 471a–471c and OSCs 472a–472c. If so, during a stage S582 of flowchart 570, compensation curve determination module 470 generates the scale factors SF1–SF5 of SFD 371 as equating a computation of an interpolation equation illustrated in stage S582 which is a function of both the scale factors SF1–SF5 of SFC 471b and the scale factors of SFC 471c. Compensation curve determination module 470 also generates the offset values OV1–OV5 of OSD 372 as equating a computation of an interpolation equation illustrated in stage S582 which is a function of both the offset values OV1–OV5 of OSC 472b and the scale factors of OSC 472c.

Otherwise, during a stage S584 of flowchart 260, compensation curve determination module 470 the scale factors SF1–SF5 of SFD 371 as equating the scale factors SF1–SF5 of SFC 471c, respectively. Compensation curve determination module 470 also generates the offset values OV1–OV5 of OSD 372 as equating the offset values OV1–OV5 of OSC 472c.

Figure 9A:
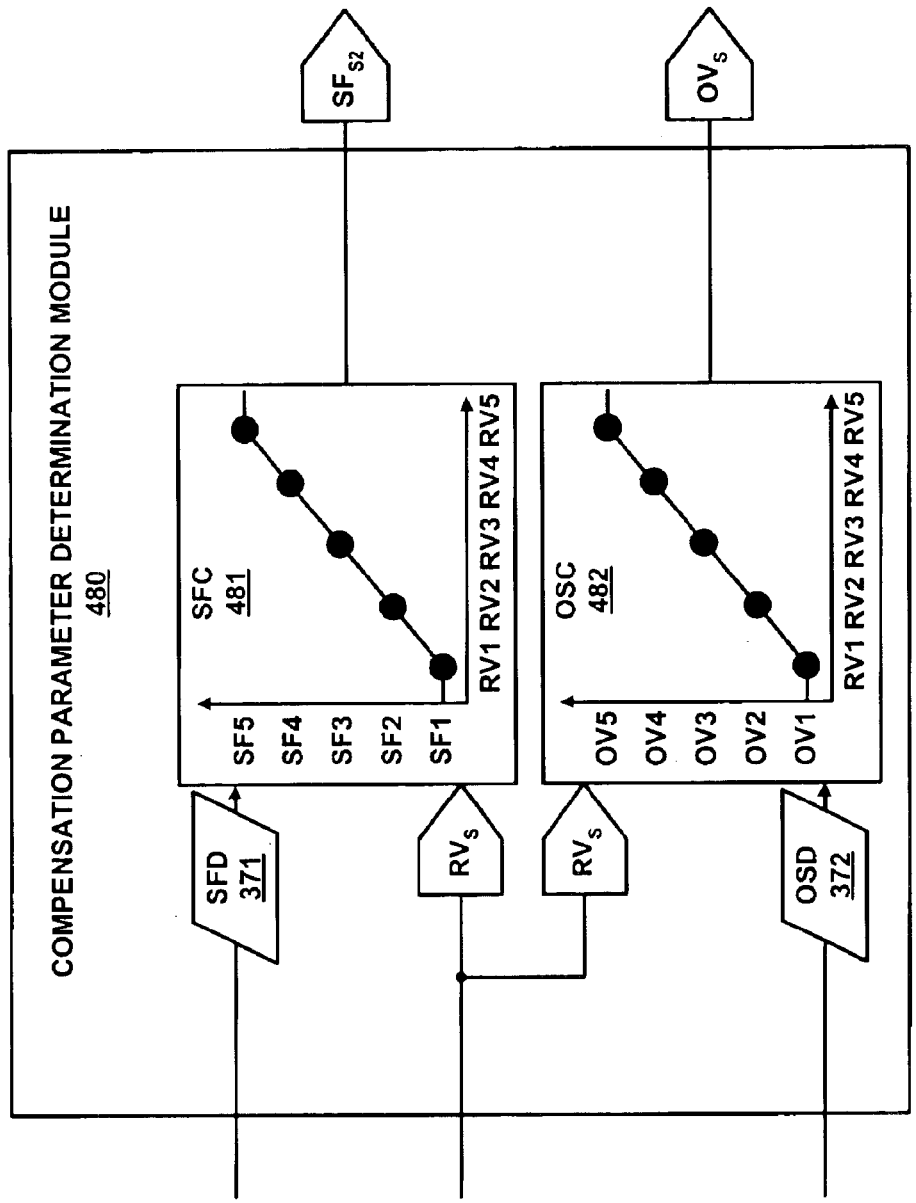
FIG. 9A is an illustration of a block diagram of one embodiment of a compensation parameter determination module in accordance with the present invention.
Figure 9B:
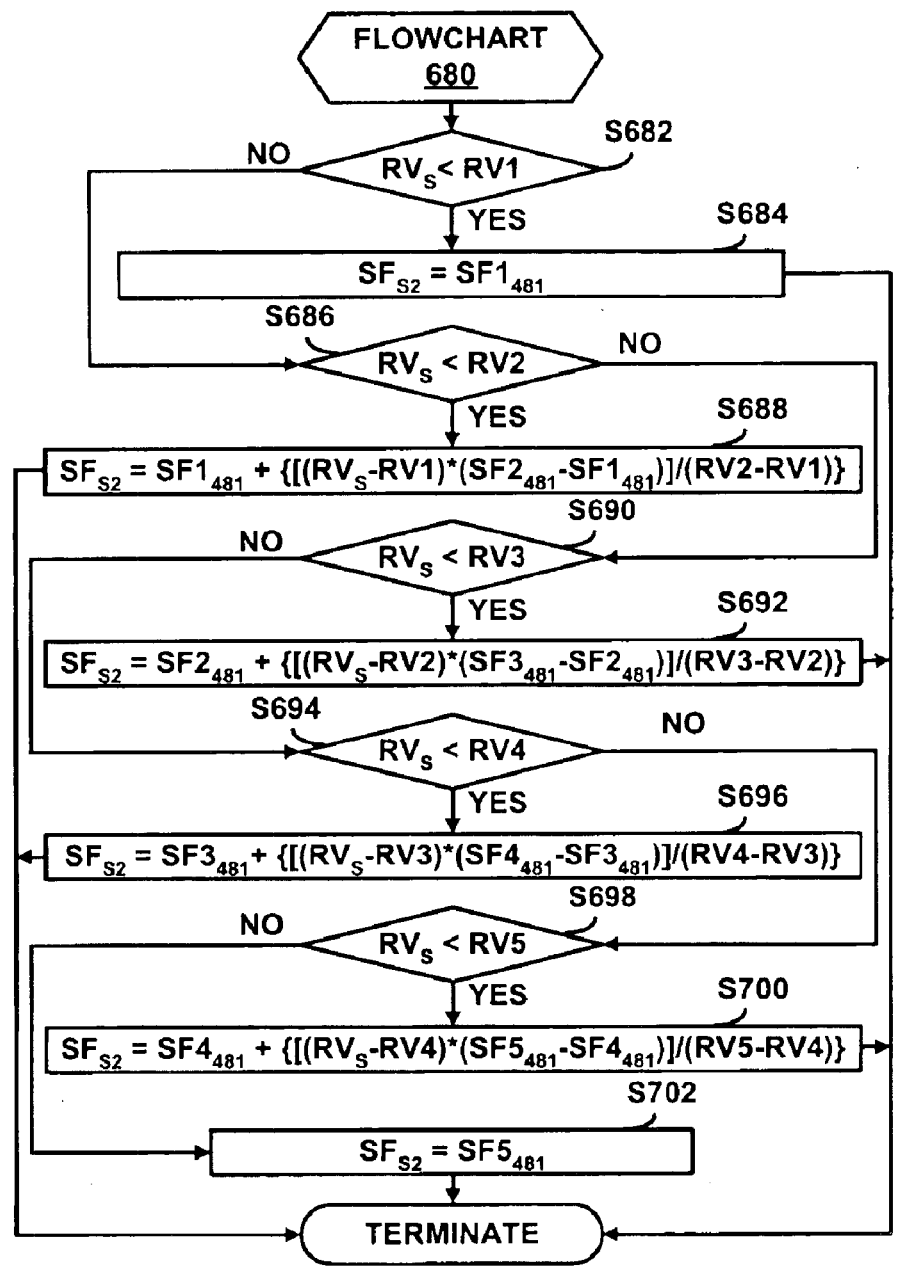
FIG. 9B is an illustration of a flowchart of one embodiment of a scale offset determination method in accordance with the present invention.

FIG. 9A illustrates a compensation parameter determination module 480 as one embodiment of compensation parameter determination module 380 (FIG. 7). Compensation parameter determination module 480 provides scale factor signal $SF_{S2}$ (FIG. 7) and offset value signal $OV_S$ (FIG. 7) in response to relative velocity signal $RV_S$, SFD 371, and OSD 372. In generating scale factor signal $SF_{S2}$, compensation parameter determination module 480 includes a scale factor curve 481 ("SFC 481") that includes scale factor data SF1–SF5 included within SFD 371, and relative velocities RV1–RV5 that are identical to the relative velocities RV1–RV5 listed in SFC 471a–471c and OSC 472a–472c (FIG. 8A). Compensation parameter determination module 480 utilizes SFC 481 in implementing a scale factor determination method in accordance with the present invention. FIG. 9B illustrates a flowchart 680 that is representative of the scale factor determination method.

During a stage S682 of flowchart 680, compensation parameter determination module 480 determines if relative velocity signal $RV_S$ is less than a relative velocity RV1 as listed in SFC 481. If so, during a stage S684 of flowchart 680, compensation parameter determination module 480 generates scale factor signal $SF_{S2}$ equating a scale factor SF1 as listed in SFC 481.

Otherwise, during a stage S686 of flowchart 680, compensation parameter determination module 480 determines if relative velocity signal $RV_S$ is less than a relative velocity RV2 as listed in SFC 481. If so, during a stage S688 of flowchart 680, compensation parameter determination module 480 generates scale factor signal $SF_{S2}$ equating a computation of an interpolation equation illustrated in stage S688, which is a function of scale factor SF1, a scale factor SF2, relative velocity RV1, and relative velocity $RV_S$ as listed in SFC 481.

Otherwise, during a stage S690 of flowchart 680, compensation parameter determination module 480 determines if relative velocity signal $RV_S$ is less than a relative velocity RV3 as listed in SFC 481. If so, during a stage S692 of flowchart 680, compensation parameter determination module 480 generates scale factor signal $SF_{S2}$ equating a computation of an interpolation equation illustrated in stage S692, which is a function of scale factor SF2, a scale factor SF3, relative velocity RV2, and relative velocity RV3 as listed in SFC 481.

Otherwise, during a stage S694 of flowchart 680, compensation parameter determination module 480 determines if relative velocity signal $RV_S$ is less than a relative velocity RV4 as listed in SFC 481. If so, during a stage S696 of flowchart 680, compensation parameter determination module 480 generates scale factor signal $SF_{S2}$ equating a computation of an interpolation equation illustrated in stage S696, which is a function of scale factor SF3, a scale factor SF4, relative velocity RV3, and relative velocity RV4 as listed in SFC 481.

Otherwise, during a stage S698 of flowchart 680, compensation parameter determination module 480 determines if relative velocity signal $RV_S$ is less than a relative velocity RV5 as listed in SFC 481. If so, during a stage S700 of flowchart 680, compensation parameter determination module 480 generates scale factor signal $SF_{S2}$ equating a computation of an interpolation equation illustrated in stage S700, which is a function of scale factor SF4, a scale factor SF5, relative velocity RV4, and relative velocity RV5 as listed in SFC 481.

Otherwise, during a stage S702 of flowchart 680, compensation parameter determination module 480 generates scale factor signal $SF_{S2}$ equating scale factor SF5 as listed in SFC 481.

Figure 9C:
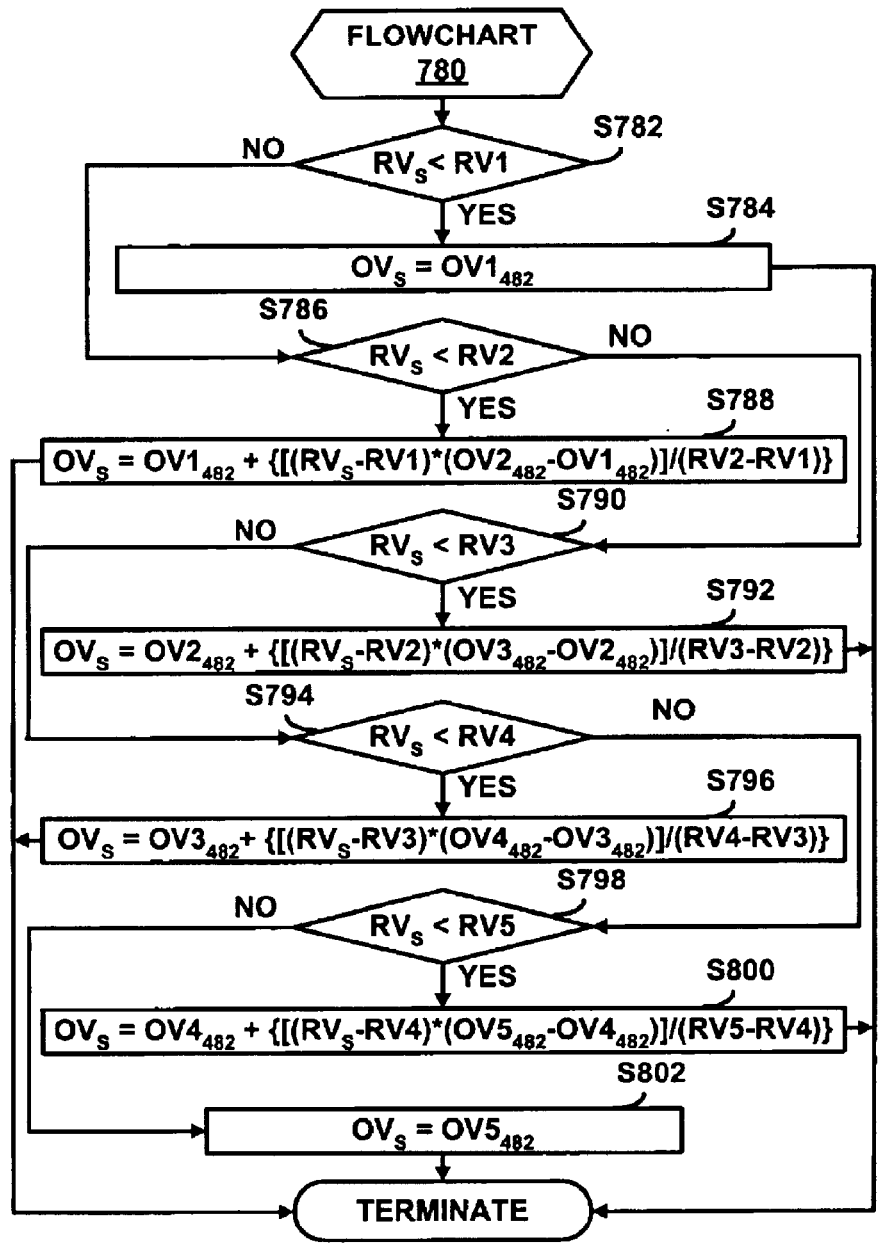
FIG. 9C is an illustration of a flowchart of a second embodiment of a scale factor determination method in accordance with the present invention.

In generating offset value signal $OV_S$, compensation parameter determination module 480 includes an offset curve 482 ("OSC 482") that includes offset values OV1–OV5 included within OSD 372, and relative velocities RV1–RV5 that are identical to the relative velocities RV1–RV5 listed in SFC 471a–471c and OSC 472a–472c (FIG. 8A). Compensation parameter determination module 480 utilizes OSC 482 in implementing an offset value determination method in accordance with the present invention. FIG. 9C illustrates a flowchart 780 that is representative of the offset value determination method.

During a stage S782 of flowchart 780, compensation parameter determination module 480 determines if relative velocity signal $RV_S$ is less than a relative velocity RV1 as listed in OSC 482. If so, during a stage S784 of flowchart 780, compensation parameter determination module 480 generates offset value signal $OV_S$ equating an offset value OV1 as listed in OSC 482.

Otherwise, during a stage S786 of flowchart 780, compensation parameter determination module 480 determines if relative velocity signal $RV_S$ is less than a relative velocity RV2 as listed in OSC 482. If so, during a stage S788 of flowchart 780, compensation parameter determination module 480 generates offset value signal $OV_S$ equating a computation of an interpolation equation illustrated in stage S788, which is a function of offset value OV1, an offset value OV2, relative velocity RV1, and relative velocity RVS as listed in OSC 482.

Otherwise, during a stage S790 of flowchart 780, compensation parameter determination module 480 determines if relative velocity signal $RV_S$ is less than a relative velocity RV3 as listed in OSC 482. If so, during a stage S792 of flowchart 780, compensation parameter determination module 480 generates offset value signal $OV_S$ equating a computation of an interpolation equation illustrated in stage S792, which is a function of offset value OV2, an offset value OV3, relative velocity RV2 and relative velocity RV3 as listed in OSC 482.

Otherwise, during a stage S794 of flowchart 780, compensation parameter determination module 480 determines if relative velocity signal $RV_S$ is less than a relative velocity RV4 as listed in OSC 482. If so, during a stage S796 of flowchart 780, compensation parameter determination module 480 generates offset value signal $OV_S$ equating a computation of an interpolation equation illustrated in stage S796, which is a function of offset value OV3, an offset value OV4, relative velocity RV3, and relative velocity RV4 as listed in OSC 482.

Otherwise, during a stage S798 of flowchart 780, compensation parameter determination module 480 determines if relative velocity signal $RV_S$ is less than a relative velocity RV5 as listed in OSC 482. If so, during a stage S800 of flowchart 780, compensation parameter determination module 480 generates offset value signal $OV_S$ equating a computation of an interpolation equation illustrated in stage S800, which is a function of offset value OV4, an offset value OV5, relative velocity RV4 and relative velocity RV5 as listed in OSC 482.

Otherwise, during a stage S802 of flowchart 780, compensation parameter determination module 480 generates offset value signal $OV_S$ equating offset value OV5 as listed in OSC 482.

Referring to FIGS. 6B, 8B, 9B and 9C, those having ordinary skill in the art will appreciate that the sets of operations depicted in flowcharts 260, 570, 680 and 780, respectively, each represents one of many possible methods for implementing a mathematical relationship between the associated input and output parameters. In the illustrated embodiments, flowcharts 260, 570, 680 and 780 each depict table look-up operations with a plurality of points, with interpolation used between points and saturation used at the extremes. In alternative embodiments of flowcharts 260, 570, 680 and 780, the look-up table operations may include extrapolation beyond the look-up table end-points in lieu of saturation and/or direct selection of look-up table points between table points in lieu of linear interpolation. Furthermore, the number of points illustrated in the look-up tables of FIGS. 6A, 8A and 9A can be increased or decreased based on the desired look-up table resolution and any existing implementation limitations (e.g., size of computer memory). In addition to the look-up table embodiments described herein, many other alternative embodiments also exist, such as, for example, implementation of a polynomial equation relating the output parameter to the input parameter.

Those having ordinary skill in the art will appreciate various advantages of the present invention for the preceding description herein of FIGS. 2–9C. One important advantage is a nearly ideal temperature compensation within the limits of a damper performance envelope of MR damper 10 (FIG. 1). Specifically, current command module 40 (FIG. 2) generates operating current $I_{OS1}$ (FIG. 2) which has a known correlation to a damping force of MR damper 10 at a measured velocity of MR damper 10, and a baseline temperature. The various temperature- and relative velocity-dependent offset and scale factor curves described in connection with FIGS. 6A, 8A, and 9A are accordingly developed to optimize a temperature compensation to generate operating current $I_{OS2}$ (FIG. 2) that allows MR damper 10 to produce the damping force at a measured velocity in view of the existing operating temperature of MR damper 10.

The present invention has been described herein in the context of controlling a MR damper. The present invention, however, can be employed to control other controllable dampers as would occur to those having ordinary skill in the art, such as, for example, controllable dampers using one or more electro-mechanical valve(s). Additionally, the present invention can be employed in other devices using MR fluid or the like as would occur to those having ordinary skill in the art, such as, for example, fan clutches and engine mounts.

While the embodiments of the present invention disclosed herein are presently considered to be preferred, various changes and modifications can be made without departing from the spirit and scope of the invention. The scope of the invention is indicated in the appended claims, and all changes that come within the meaning and range of equivalents are intended to be embraced therein.

We claim:

1. A method for controlling a damping force of a damper, said method comprising:

generating a first operating current as a function of a desired force level of the damping force;

determining a first temperature compensation factor in the form of a scale factor as a function of an operating temperature of the damper and a relative velocity of the damper;

determining a second temperature compensation factor in a form of an offset value as a function of the operating temperature of the damper and the relative velocity of the damper; and providing a second operating current to the damper in response to a determination of the scale factor and the offset value.

2. A method for controlling a damping force of a damper, said method comprising:

generating a first operating current as a function of a desired force level of the damping force;

determining a scale factor and an offset value as a function of an operating temperature of the damper and a relative velocity of the damper;

providing a second operating current to the damper in response to a determination of the scale factor and the offset value;

generating a third operating current as a product of the first operating current and the scale factor; and generating the second operating current as a summation of the third operating current and the offset value.

3. A method for controlling a damping force of a damper, said method comprising:

generating a first operating current as a function of a desired force level of the damping force;

determining a scale factor and an offset value as a function of an operating temperature of the damper and a relative velocity of the damper;

providing a second operating current to the damper in response to a determination of the scale factor and the offset value;

generating a third operating current as a summation of the first operating current and the offset value; and generating the second operating current as a product of the third operating current and the scale factor.

4. A device for controlling a damping force of a damper, said device comprising:

a first module operable to generate a first operating current as a function of a desired force level of the damping force; and a second module operable to determine a first temperature compensation factor in a form of a scale factor as a function of an operating temperature of the damper and a relative velocity of the damper and to determine a second temperature compensation factor in a form of an offset value as a function of the operating temperature of the damper and the relative velocity of the damper, said second module is further operable to provide a second operating current to the damper in response to a determination of the scale factor and the offset value.

5. A device for controlling a damping force of a damper, said device comprising:
a first module operable to generate a first operating current as a function of a desired force level of the damping force; and
a second module operable to determine a scale factor and an offset value as a function of an operating temperature of the damper and a relative velocity of the damper, said second module is further operable to provide a second operating current to the damper in response to a determination of the scale factor and the offset value,
wherein said second module is further operable to generate a third operating current as a product of the first operating current and the scale factor, and
wherein said second module is further operable to generate the second operating current as a summation of the third operating current and the offset value.

6. A device for controlling a damping force of a damper, said device comprising:
a first module operable to generate a first operating current as a function of a desired force level of the damping force; and
a second module operable to determine a scale factor and an offset value as a function of an operating temperature of the damper and a relative velocity of the damper, said second module is further operable to provide a second operating current to the damper in response to a determination of the scale factor and the offset value,
wherein said second module is further operable to generate a third operating current as a summation of the first operating current and the offset value, and
wherein said second module is further operable to generate the second operating current as a product of the third operating current and the scale factor.

7. A system, comprising:
a damper operable to provide a damping force in response to a reception of a first operating current; and
a controller,
wherein said controller is operable to generate a second operating current as a function of a desired force level of the damping force,
wherein said controller is operable to determine a first temperature compensation factor in a form of a scale factor as a function of an operating temperature of the damper and a relative velocity of the damper and to determine a second temperature compensation factor in a form of an offset value as a function of the operating temperature of the damper and the relative velocity of the damper, and
wherein said controller is operable to provide the first operating current to the damper in response to a determination of the scale factor and the offset value.

8. A system, comprising:
a damper operable to provide a damping force in response to a reception of a first operating current; and
a controller,
wherein said controller is operable to generate a second operating current as a function of a desired force level of the damping force,
wherein said controller is further operable to determine a scale factor and an offset value as a function of an operating temperature of the damper and a relative velocity of the damper,
wherein said controller is further operable to provide the first operating current to the damper in response to a determination of the scale factor and the offset value,
wherein said controller is further operable to generate a third operating current as a product of the second operating current and the scale factor, and
wherein said controller is further operable to generate the first operating current as a summation of the third operating current and the offset value.

9. A system, comprising:
a damper operable to provide a damping force in response to a reception of a first operating current; and
a controller,
wherein said controller is operable to generate a second operating current as a function of a desired force level of the damping force,
wherein said controller is further operable to determine a scale factor and an offset value as a function of an operating temperature of the damper and a relative velocity of the damper,
wherein said controller is further operable to provide the first operating current to the damper in response to a determination of the scale factor and the offset value,
wherein said controller is further operable to generate a third operating current as a summation of the second operating current and the offset value, and
wherein said controller is further operable to generate the first operating current as a product of the third operating current and the scale factor.

10. A system, comprising:
a damper operable to generate a damping force; and
a controller including
a first module operable to generate a first operating current as a function of a desired force level of the damping force,
a second module operable to determine a set of scale factors and a set of offset values as a function of an operating temperature of said damper, and
a third module operable to determine a scale factor of the set of scale factors and an offset value of the set of offset values as a function of a relative velocity of said damper, the scale factor being a first temperature compensation factor and the offset value being a second temperature compensation factor.

11. The system of claim 10, wherein said controller further includes a fourth module operable to generate a signal indicative of an ambient temperature of said damper.

12. The system of claim 10, wherein said controller further includes a fourth module operable to generate a signal indicative of a measured temperature of said damper.

13. The system of claim 10, wherein said controller further includes a fourth module operable to generate a signal indicative of an estimated temperature of said damper.

14. A system, comprising:
a damper operable to generate a damping force; and
a controller including
a first module operable to generate a first operating current as a function of a desired force level of the damping force,
a second module operable to determine a set of scale factors and a set of offset values as a function of an operating temperature of said damper,
a third module operable to determine a scale factor of the set of scale factors and an offset value of the set of offset values as a function of a relative velocity of said damper,
wherein said third module is further operable to generate a second operating current as a product of the scale factor and the first operating current, wherein said third module is further operable to generate a third operating current as a summation of the offset value and the second operating current, and wherein said controller is operable to communicate the third operating current to said damper.

15. A system, comprising:

a damper operable to generate a damping force; and a controller including a first module operable to generate a first operating current as a function of a desired force level of the damping force, a second module operable to determine a set of scale factors and a set of offset values as a function of an operating temperature of said damper, a third module operable to determine a scale factor of the set of scale factors and an offset value of the set of offset values as a function of a relative velocity of said damper, wherein said third module is further operable to generate a second operating current as a summation of the offset value and the first operating current, wherein said third module is further operable to generate a third operating current as a product of the scale factor and the second operating current, and wherein said controller is operable to communicate the third operating current to said damper.

* * * * *